United States Patent
Ukegawa

Patent Number: 5,305,376
Date of Patent: Apr. 19, 1994

[54] FACSIMILE MACHINE WITH VOICE ANSWER UNIT

[75] Inventor: Takeshi Ukegawa, Hadano, Japan

[73] Assignee: Ricoh Company, Ltd., Tokyo, Japan

[21] Appl. No.: 17,995

[22] Filed: Feb. 16, 1993

Related U.S. Application Data

[63] Continuation of Ser. No. 587,038, Sep. 24, 1990, abandoned.

Foreign Application Priority Data

Sep. 25, 1989 [JP] Japan ................................. 1-246534

[51] Int. Cl.⁵ .................... H04M 11/00; H04N 1/42
[52] U.S. Cl. .................................. 379/100; 379/88; 358/434
[58] Field of Search ................ 379/100, 94, 96, 97, 379/98, 93, 88, 266, 214; 358/434, 401, 404, 439, 442, 443, 444

[56] References Cited

U.S. PATENT DOCUMENTS

| | | | |
|---|---|---|---|
| 4,788,715 | 11/1988 | Lee | 379/266 |
| 4,823,376 | 4/1989 | Takahashi | 329/100 |
| 4,825,461 | 4/1989 | Kurita et al. | 379/100 |
| 4,894,843 | 1/1990 | Yoshida | 379/100 |
| 4,935,955 | 6/1990 | Neudorfer | 329/100 |
| 4,954,958 | 9/1990 | Savage et al. | 379/88 |
| 5,020,095 | 5/1991 | Morganstein et al. | 379/214 |
| 5,025,468 | 6/1991 | Sikand et al. | 379/309 |

Primary Examiner—Curtis Kuntz
Assistant Examiner—Stella L. Woo
Attorney, Agent, or Firm—Oblon, Spivak, McClelland, Maier & Neustadt

[57] ABSTRACT

A facsimile machine which accommodates a plurality of lines includes a voice answer unit for generating a predetermined voice message with remaining communication time, and a processing unit, for outputting the voice answer message generated by the voice answer unit to one of the lines via which a call is received, when the call is received via one of the lines during a communication via another line, so that the voice answer message is transmitted to a calling station.

5 Claims, 5 Drawing Sheets

FIG.5

| I/O SPEED (m sec.) | CODING | LINEAR DENSITY | BIT RATE (bps) | TIME (sec.) |
|---|---|---|---|---|
| 0 (5) (10) (20) (40) | MH | STD | 9600 | T(0,1) |
| | | | 7200 | T(0,2) |
| | | | 4800 | T(0,3) |
| | | DTL | 9600 | T(0,4) |
| | | | 7200 | T(0,5) |
| | | | 4800 | T(0,6) |
| | MR | STD | 9600 | T(0,7) |
| | | | 7200 | T(0,8) |
| | | | 4800 | T(0,9) |
| | | DTL | 9600 | T(0,10) |
| | | | 7200 | T(0,11) |
| | | | 4800 | T(0,12) |

FACSIMILE MACHINE WITH VOICE ANSWER UNIT

This application is a continuation of application Ser. No. 07/587,038, filed on Sep. 24, 1990, now abandoned.

BACKGROUND OF THE INVENTION

The present invention generally relates to a facsimile machine, and more particularly to a facsimile machine which accommodates a plurality of lines.

Conventionally, a facsimile machine which accommodates a plurality of lines, such as a plurality of extensions, an extension and an outside line, and a plurality of outside lines, has been put to practical use. Then, the conventional facsimile machine selects arbitrarily one of the lines and transmits image information via the selected line.

When the conventional facsimile machine described above receives a new call via another line during the transmission of the image information via the selected line, it is impossible to answer this call so that the calling continues. Thus, in a calling facsimile which sends the call in accordance with a manual operation, it is impossible to know the state of the facsimile which receives the call as has been described above so that it is necessary for an operator of the calling facsimile to wait for a long time. In addition, the operator of the calling facsimile is not capable of knowing when the facsimile which receives the call has completed the transmitting of the image information.

SUMMARY OF THE INVENTION

Accordingly, a general object of the present invention is to provide a novel and useful facsimile machine in which the disadvantages of the aforementioned prior art are eliminated.

A more specific object of the present invention is to provide a facsimile machine which is capable of answering that the facsimile machine is operating.

The above objects of the present invention are achieved by a facsimile machine comprising voice answer means for generating a predetermined voice message, and control means coupled between the voice answer means and the lines, for outputting the predetermined voice answer message generated by the voice answer means to one of the lines via which a call is received when the call is received via the one of the lines during a communication via another line, so that the predetermined voice answer message is transmitted to a calling station.

Additional objects, features and advantages of the present invention will become apparent from the following detailed description when read in conjunction with the accompanying drawings.

BRIEF DESCRIPTION OF THE DRAWINGS

FIG. 5 is a table showing a time required in a variety of cases for completing transmission of remaining image information in a memory transmission mode.

DESCRIPTION OF THE PREFERRED EMBODIMENTS

A description will now be given of a first embodiment with reference to FIGS. 1 through 3.

Figure 1:
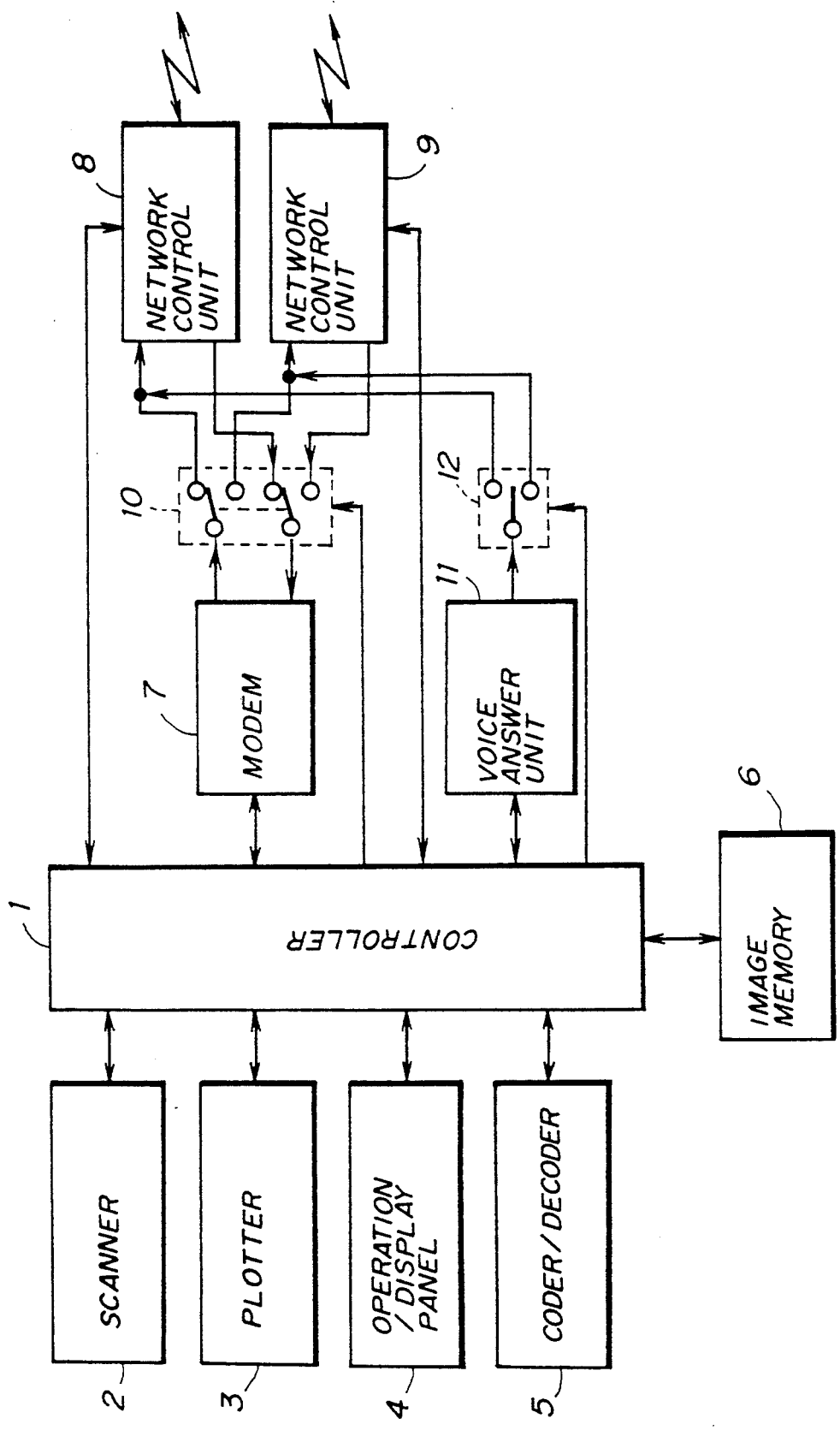
FIG. 1 is a block diagram showing a basic structure of a facsimile machine of an embodiment according to the present invention.

Referring to FIG. 1, which shows a basic structure of a facsimile machine, it is seen that this facsimile machine has a controller 1, a scanner 2, a plotter 3, an operation/display panel 4 and a coder/decoder 5. The facsimile machine also has an image memory 6, a modem 7, network control units 8 and 9, switch units 10 and 12 and a voice answer unit 11.

The controller 1 controls processing in this facsimile machine and communication to group three (G III) facsimile machines. The scanner 2 scans a document and reads an image thereon at a predetermined resolution. The plotter 3 outputs an image at a predetermined resolution. The operation/display panel 4 is an interface between the facsimile machine and an operator, and has various types of operation keys and a display for indicating information. The coder/decoder 5 codes and compresses image signals on the basis of a predetermined coding procedure and decodes the coded and compressed image signals to the original image signals. The coded and compressed image data is supplied to the image memory 6. The image memory 6 has a capacity which amounts to a predetermined plurality of pages. The modem 7 modulates a digital data so as to be capable of transmitting information via an analogue transmitting line such as a public phone line and demodulates a transmitted signal via the analogue line. The network control units 8 and 9 respectively connect this facsimile machine to the lines. That is, this facsimile machine accommodates two lines and each of the lines is connected to this facsimile by a corresponding network control unit 8 (or 9). The switch unit 10 selectively connects either the network control unit 8 or 9 to the modem 7. The network control units 8 and 9 respectively have a function which automatically sends and receives information. The voice answer unit 11 generates voice answer signals. The switch unit 12 selectively supplies the voice answer signals output from the voice answer unit 11 to either the network control unit 8 or 9 in accordance with an instruction from the controller 1. The switch unit 12 is usually controlled so that the voice answer signals are supplied to neither the network control unit 8 nor 9.

Figure 2:
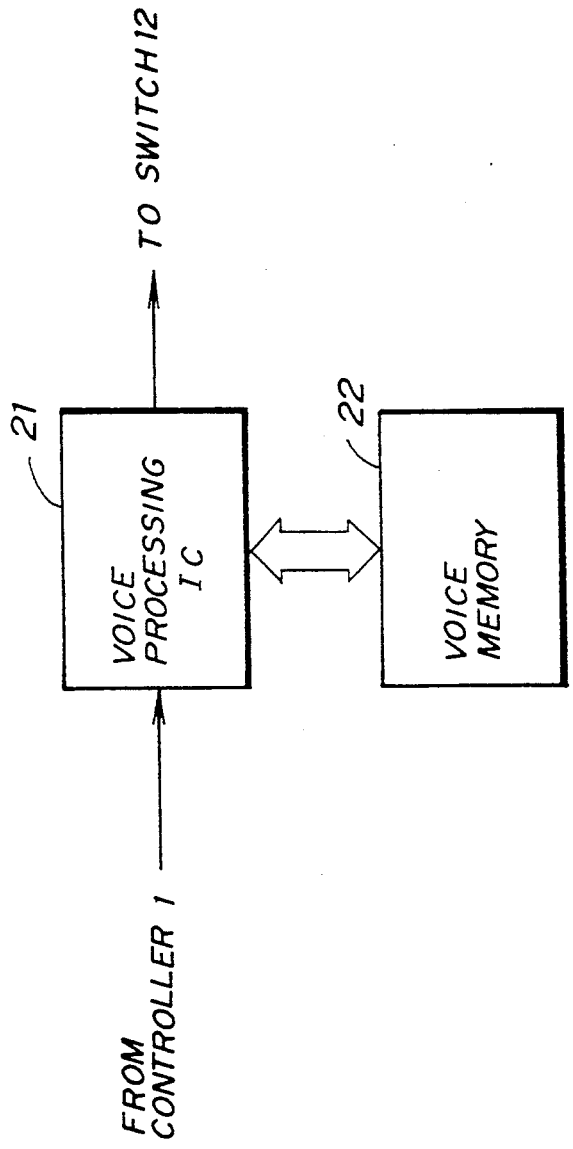
FIG. 2 is a block diagram illustrating a structure of the voice answer unit shown in FIG. 1.

The voice answer unit 11 has, for example, a structure as shown in FIG. 2. Referring to FIG. 2, the voice answer unit 11 has a voice processing IC 21 and a voice memory 22. The voice memory 22 stores a voice answer message such as "THIS FACSIMILE IS BEING USED NOW" The voice processing IC 21 reads out the voice answer message from the voice memory 22 and sends it to the switch unit 12, in accordance with the control of the controller 1.

When the document is set in the scanner 2 and the operator operates the operation/display panel 4 to transmit information, the controller 1 supplies information regarding a destination station to the network control unit 8. The network control unit 8 calls the specified destination station, and then image information read by the scanner 2 is transmitted via the line connected to the network control unit 8 to the destination station.

Figure 3:
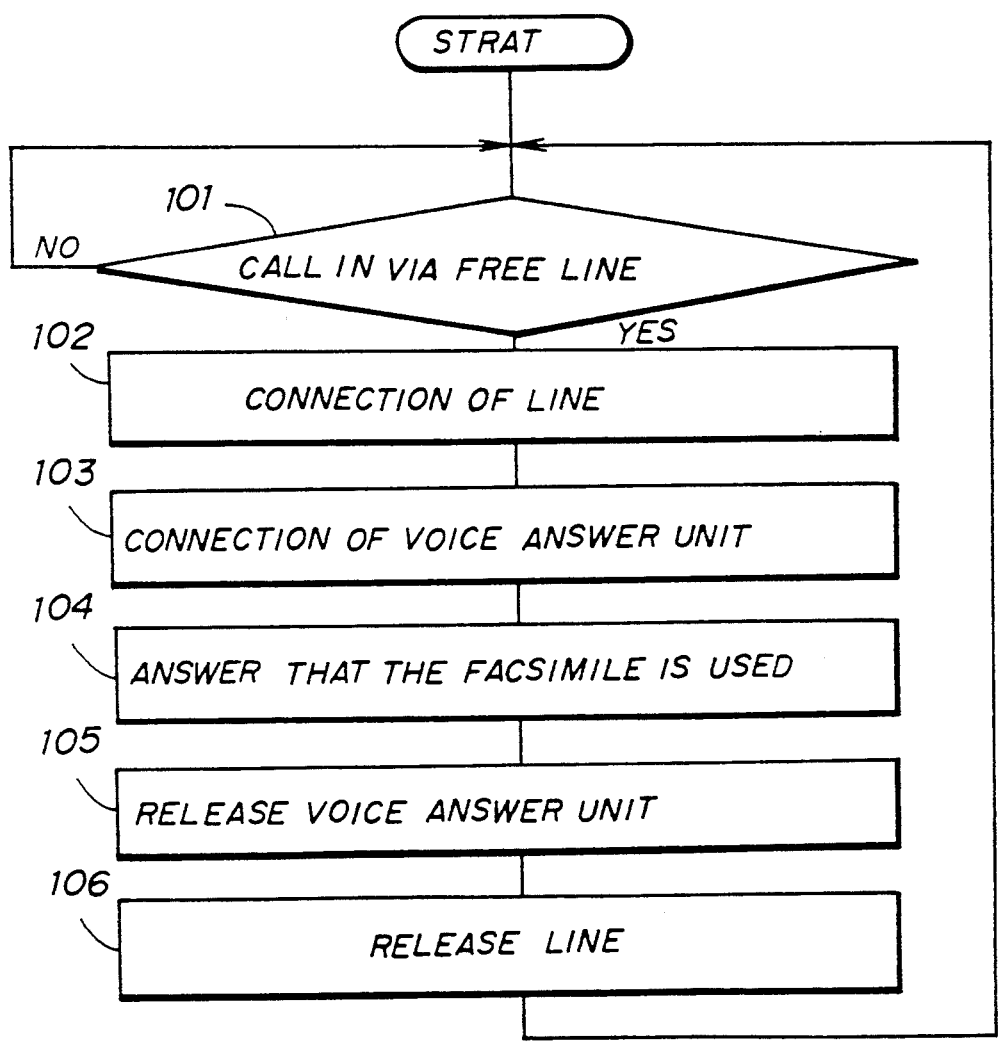
FIGS. 3 and 4 are flow charts respectively showing an example of a process in a case where a call is received during a transmission of image information.

While the image information is being transmitted via the line connected to the network control unit 8, the controller 1 also performs processing in accordance with a flow chart shown in FIG. 3. Referring to FIG.3, a step 101 discriminates whether or not the network control unit 9 corresponding to a free line receives a call. When the network control unit 9 receives the call, and therefore the discrimination result in the step 101 is YES, a step 102 connects the line to the network control unit 9. A step 103 operates the switch unit 12 so that the voice answer unit 11 is coupled to the network control unit 9. Then, the voice answer message "THIS FACSIMILE IS BEING USE NOW" output from the voice answer unit 11 is supplied via the switch unit 12 to the network control unit 9. The network control unit 9, in a step 104, outputs the voice answer message "THIS FACSIMILE IS BEING USE NOW" to the line connected to it. The voice message is transmitted via the line connected to the network control unit 9 to a calling station, and then the calling station outputs the voice answer message. That is, the calling station says "THIS FACSIMILE IS BEING USED NOW".

When the voice answer unit 11 supplies a signal which represents the end of the answer to the controller 1, a step 105 releases the switch unit 12 so that the voice answer message is supplied to neither the network control unit 8 nor 9. The network control unit 9, in a step 106, releases the line.

In addition, when the facsimile machine receives the image information via the line connected to one of the network control units 8 and 9, the facsimile machine operates in a manner similar to the above described operation.

In the embodiment described above, when the call is received via the line connected to the network control unit 9 during the transmission of the image information via the line connected to the network control unit 8, the voice answer message is returned via the line connected to the network unit 9 to the calling station. Therefore, an operator of the calling station is capable of recognizing that a called facsimile is sending or receiving the image information via another line due to its hearing the voice answer message. That is, the operator is capable of recognizing whether or not the called facsimile can continue receiving the image information.

A description will now given of a second embodiment of the present invention.

The facsimile machine has a so-called memory transmission mode. In the memory transmission mode, the image information coded and compressed, corresponding to the entire image on the documents, is stored in the image memory 6, and then the image information read from the image memory 6 is successively transmitted for every page via the line. When the image information is transmitted in the memory transmission mode, it is possible to calculate the time required for completing the transmission of the remaining untransmitted image information in the image memory. In this embodiment, the calling station is also informed of the time required for completing the transmission of the remaining image information.

In this embodiment, it is assumed that the scanner 2 is capable of reading an A4 size document and a B4 size document and has a standard mode (STD) and a detailed mode (DTL). Linear densities for reading an image on the document in the standard mode (STD) and the detailed mode (DTL) are respectively 3.75 lines/ mm and 7.7 lines/ mm. A table which represents the time required for the transmission of image data in one page under various transmittion conditions is, for example, predetermined as shown in FIG. 5. This table is stored in a memory (not shown in FIG. 1) provided in the controller 1. In the table shown in FIG. 5, "I/O SPEED" represents the time which is required by a destination station for receiving the image information for one line. "CODING" is a method which codes and compresses the image information, MH in the "CODING" column represents the modified Huffman coding and MR in the "CODING" column represents the modified READ coding. STD in the "LINEAR DENSITY" column represents the standard mode and DTL in the "LINEAR DENSITY" column represents the detailed mode. T(0,1) through T(0,12) in the "TIME" column respectively represent the approximate time required for transmission of image information for one page in a variety of cases. FIG. 5 shows the table in the case where the I/O speed is 0 ( m sec.). In the cases where the I/O speeds are 5 ( m sec.) , 10 ( m sec.) , 20 ( m sec. ) and 40 ( m sec.), respectively, the table is similarly determined and stored in the memory.

Figure 4:
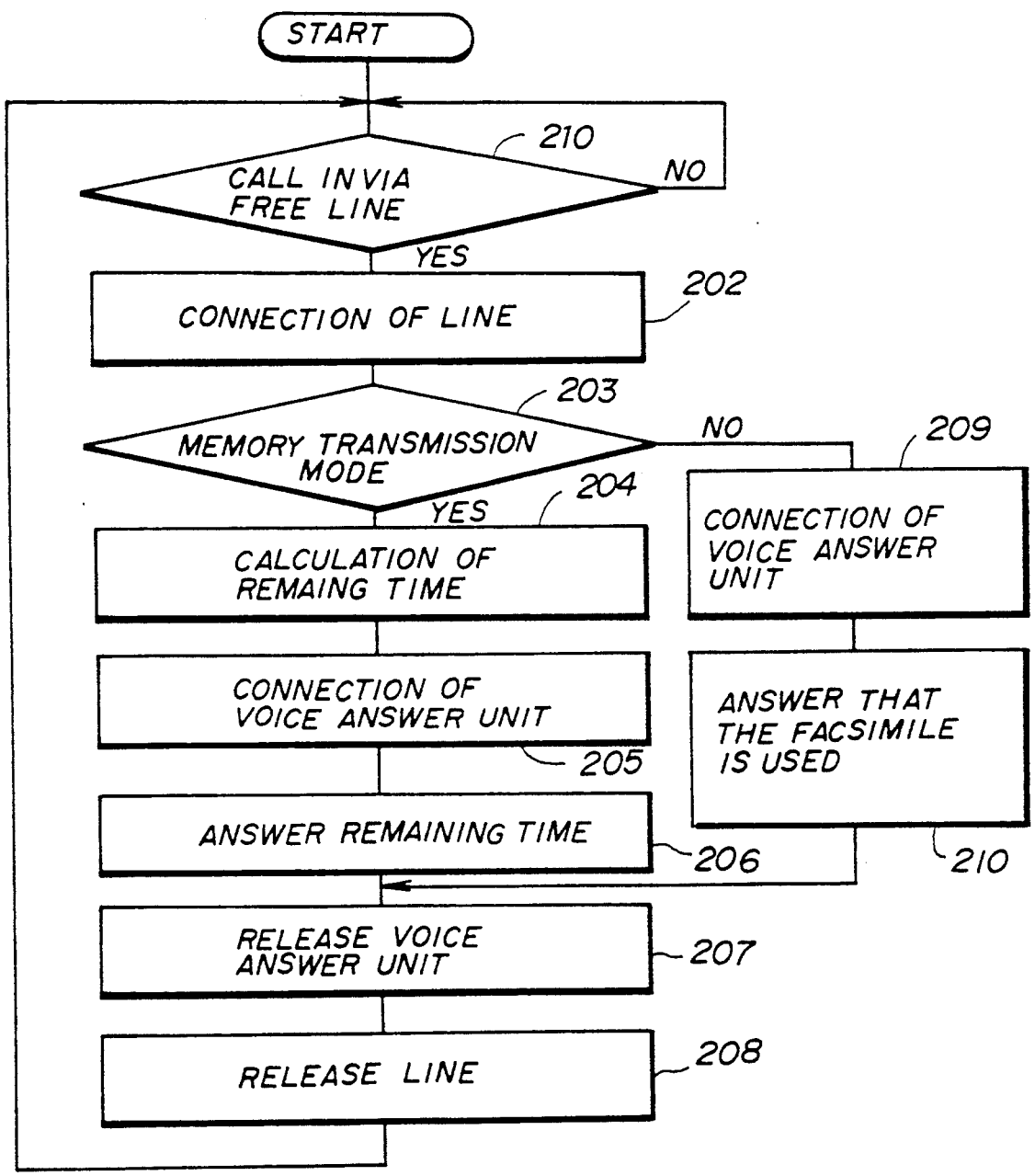

In one case, the facsimile machine transmits the image information via the line connected to the network control unit 8. In this case, the controller 1 processes in accordance with the flow chart shown in FIG. 4.

A step 201 discriminates whether or not the network control unit 9 corresponding to the free line receives a call. When the network control unit 9 receives the call and therefore the discrimination result in the step 101 is YES, a step 202 connects the line to the network control unit 9.

Then a step 203 discriminates whether or not image information is being transmitted in the memory transmission mode. When the discrimination in the step 203 is YES, a step 204 calculates the time required for completing the transmission of the remaining image information. In this step 204, the time which is required for transmission of image information for one page is determined on the basis of the transmission conditions, such as document size, the coding method, the linear density and so on, as shown in the table in FIG. 5. Then the time required for one page is multiplied by the number of remaining pages of the image information in the image memory 6 so that the time required for the transmission of the remaining image information is calculated in minute units. The time required for the transmission of the remaining image information is, for example, called a remaining communication time.

After the remaining communication time is calculated, a step 205 operates the switch unit 12 so that the voice answer unit 11 is coupled to the network unit 9. Then the controller 1 supplies the remaining communication time described above to the voice answer unit 11. The voice processing IC 21 of the voice answer unit 11 reads out the voice answer message "THIS FACSIMILE IS BEING USED NOW" and a voice time data (Tr) corresponding to the remaining communication time from the voice memory 22. That is, in this case, the voice time data corresponding to the remaining communication time in each of the cases shown in the table in FIG. 5 is previously stored in minute units in the voice memory 22. The voice processing IC 21 composes the voice answer message "THIS FACSIMILE IS BEING USED NOW" and the voice time data (Tr) so that a new voice answer message "THIS FACSIMILE IS BEING USED NOW, AND THE TIME REQUIRED FOR COMPLETING THE COMMUNICATION IS ABOUT Tr MINUTES" is output from the voice processing IC 21. This voice answer message is supplied to the network control unit 9. The network control unit 9, in a step 206, outputs the voice answer message "THIS FACSIMILE IS BEING USED NOW, AND THE TIME REQUIRED FOR COMPLETING THE COMMUNICATION IS ABOUT Tr MINUTES" to the line connected to it. The voice answer message is transmitted via the line connected to the network control unit 9 to the calling station, and then the calling station outputs the voice answer message. That is, the calling station says "THIS FACSIMILE IS BEING USED NOW, AND THE TIME REQUIRED FOR COMPLETING THE COMMUNICATION IS ABOUT Tr MINUTES".

When the voice answer unit 11 supplies a signal which represents the end of the answer to the controller 1, a step 207 releases the switch unit 12 so that the voice answer message is supplied to neither the network control unit 8 nor 9. The network control unit 9, in a step 208, releases the line.

On the other hand, when the image information is transmitted in a mode other than the memory transmission mode and therefore the discrimination result in the step 203 is NO, a step 209 operates the switch unit 12 so that the voice answer unit 11 is coupled to the network control unit 9. Then the voice answer unit 11 outputs the same message as the first embodiment so that the voice answer message "THIS FACSIMILE IS BEING USED NOW" is transmitted via the line connected to the network control unit 9 to the calling station.

In the embodiment described above, when the call is received via the line connected to the network control unit 9 during the transmission of the image information in the memory transmission mode via the line connected to the network control unit 8, the voice answer message including the time required for completing the transmission of the remaining image information is returned via the line connected to the network control unit 9 to the calling station. Therefore, the operator of the calling station is capable of recognizing approximately time when the called facsimile can be used.

In addition, when the network control unit 8 receives the call during the sending or receiving of the image information via the line connected to the network control unit 9, the voice answer message is similarly returned via the line connected to the network control unit 8 to the calling station.

In these embodiments, the facsimile machine accommodates two lines. It is also possible for the facsimile machine according to the present invention to accommodate more than two lines. In addition, it is possible for the facsimile machine according to the present invention to communicate to group two (GII) facsimile machines.

In the second embodiment, the time required for the transmission of the remaining image information is calculated on the basis of the communication conditions, such as the I/O speed, the coding method, the linear density, the remaining pages of image data to be transmitted and so on, and then the voice time data corresponding to the required time calculated is read out from the voice memory 22. However, it is also possible to previously store the voice time data corresponding to the communication conditions in the voice memory 22 and to directly access the voice memory 22 by use of these communication conditions.

According to the present invention, when the call is received via a line during the time that the image data is being send or received via another line, the voice answer message which represents that the facsimile machine is in the busy state is returned to the calling station. Therefore, it is possible for an operator of the calling station to know of the busy state of the called facsimile.

The present invention is not limited to the aforementioned embodiments, and variations and modifications may be made without departing from the scope of the claimed invention.

What is claimed is:

1. A facsimile machine which accommodates a plurality of lines comprising:
   memory means for storing image information which is obtained by scanning of a document;
   memory transmission means, coupled to said memory means, for transmitting the image information in said memory means to an external facsimile machine via a line;
   time data generation means coupled to said memory means and memory transmission means, for generating data corresponding to a time required for transmitting an amount of remaining image information in said memory means when said memory transmission means is activated, said time data generation means including a table which represents the time required for transmitting image information for one page in each of predetermined cases;
   voice answer means for generating a voice answer message indicating that said facsimile machine is communicating to an external facsimile machine;
   determination means for determining whether or not said memory transmission means is activated when a call is received via one of the lines during a communication via another line;
   first control means, coupled to said determination means, said voice answer means and said plurality of lines, for outputting said voice answer message generated by said voice answer means to said one of the lines when said determination means determines that said memory transmission means is not activated during the communication via said another line, so that said voice answer message is transmitted to a calling station;
   second control means, coupled to said determination means, said voice answer means, said time data generation means and the lines, for outputting said voice answer message generated by said voice answer means and a voice time message corresponding to said data generated by said time data generation means to said one of the lines when said determination means determines that said memory transmission means is activated during the communication via said another line, so that said voice answer message and said voice time message are transmitted to a calling station
   wherein a calling station is informed when the facsimile machine is busy and is selectively informed of the approximate waiting time.

2. A facsimile machine as claimed in claim 1, further comprising discrimination means coupled to each of the lines for discriminating whether the call is received via one of the lines, coupling means for coupling said voice answer means to said one of the lines when said discrimination means discriminates that the call is received via said one of the lines.

3. A facsimile machine as claimed in claim 1, wherein said voice answer means has voice memory means for previously storing said voice message.

4. A facsimile machine as claimed in claim 2, wherein said coupling means has a switch unit for selectively coupling said voice answer means to each of the lines.

5. A facsimile machine as claimed in claim 1, wherein said data corresponding to the time required for transmitting the remaining image information is generated based on the time required for transmitting the image information for one page.

* * * * *